United States Patent
Haimer (10) Patent No.: US 11,123,805 B2
(45) Date of Patent: Sep. 21, 2021

(54) CLAMPING TOOLS IN A TOOL HOLDER

(71) Applicant: Franz Haimer Maschinenbau KG, Hollenbach-Igenhausen (DE)

(72) Inventor: Franz Haimer, Igenhausen (DE)

(73) Assignee: FRANZ HAIMER MASCHINENBAU KG, Hollenbach-Igenhausen (DE)

( * ) Notice: Subject to any disclaimer, the term of this patent is extended or adjusted under 35 U.S.C. 154(b) by 4 days.

(21) Appl. No.: 16/324,615

(22) PCT Filed: Aug. 9, 2017

(86) PCT No.: PCT/EP2017/070147
§ 371 (c)(1),
(2) Date: Feb. 11, 2019

(87) PCT Pub. No.: WO2018/029235
PCT Pub. Date: Feb. 15, 2018

(65) Prior Publication Data
US 2019/0168311 A1    Jun. 6, 2019

(30) Foreign Application Priority Data
Aug. 12, 2016  (DE) ...................... 10 2016 115 029.0

(51) Int. Cl.
*B23B 31/117*  (2006.01)
*B23B 31/00*  (2006.01)
(Continued)

(52) U.S. Cl.
CPC ............ *B23B 31/005* (2013.01); *B23B 31/02* (2013.01); *B23B 31/1179* (2013.01);
(Continued)

(58) Field of Classification Search
CPC ..... B23B 31/005; B23B 31/02; B23B 31/305; B23B 31/20; B23B 31/1179; B23B 2231/028; B23B 2231/06
See application file for complete search history.

(56) References Cited

U.S. PATENT DOCUMENTS

| 9,943,912 | B2 | 4/2018 | Haimer |
| 2015/0028548 | A1 | 1/2015 | Haimer |
| | | (Continued) | |

FOREIGN PATENT DOCUMENTS

| DE | 10114240 A1 | 1/2003 |
| DE | 10 2009 038629 A1 | 3/2010 |
| | (Continued) | |

OTHER PUBLICATIONS

International Search Report dated Nov. 10, 2017 for PCT/EP2017/070147 filed Aug. 9, 2017.
(Continued)

*Primary Examiner* — Eric A. Gates
*Assistant Examiner* — Paul M Janeski
(74) *Attorney, Agent, or Firm* — Paul D. Bianco; Gary S. Winer; Fleit Intellectual Property Law (57) ABSTRACT

A tool holder includes a main body, a deformable receptacle for clamping a tool, and at least one blocking element which, in order to prevent axial migration of the tool out of the tool holder, is configured to engage in a corresponding counterpart element on the tool and is arranged at the receptacle. In order to allow particularly high concentricity of the tool holder and stable fastening of the clamped-in tool, and at the same time to ensure easy production, the receptacle has two spaced-apart clamping portions, between which the at least one blocking element is arranged.

20 Claims, 5 Drawing Sheets

(51) Int. Cl.
  *B23B 31/20* (2006.01)
  *B23B 31/30* (2006.01)
  *B23B 31/02* (2006.01)

(52) U.S. Cl.
  CPC ............ *B23B 31/20* (2013.01); *B23B 31/305* (2013.01); *B23B 2231/026* (2013.01); *B23B 2231/028* (2013.01)

(56) References Cited

U.S. PATENT DOCUMENTS

2015/0321264 A1  11/2015  Suruga
2018/0333786 A1  11/2018  Haimer

FOREIGN PATENT DOCUMENTS

| | | | |
|---|---|---|---|
| DE | 10 2010 006918 A1 | 8/2011 | |
| DE | 102010024793 A1 * | 12/2011 | ........... B23B 31/005 |
| DE | 202011109498 U1 * | 2/2012 | ........... B23B 31/305 |
| DE | 102013110043 A1 * | 3/2015 | ............. B23B 31/20 |
| WO | 2013/098192 A1 | 7/2013 | |

OTHER PUBLICATIONS

Written Opinion for PCT/EP2017/070147 filed Aug. 9, 2017.
Result of search report for German Application No. 10 2016 115 029.0 filed Aug. 12, 2016.
International Preliminary Report on Patentability dated Feb. 12, 2019 with Written Opinion for PCT/EP2017/070147 filed Aug. 9, 2017 (English translation).

* cited by examiner

CLAMPING TOOLS IN A TOOL HOLDER

FIELD OF THE INVENTION

The invention concerns a tool holder for frictional clamping of tools. The invention also concerns a clamping system of such a tool holder as well as a method for production of a tool receptacle for such a tool holder.

BACKGROUND OF THE INVENTION

A tool holder is known from WO 2013/098192 A1 having a main body and a deformable receptacle for clamping of a tool. The receptacle has several blocking elements, which are designed to engage in corresponding counter-elements on the tool to prevent axial migration of the tool and are arranged on the receptacle.

SUMMARY OF THE INVENTION

One aspect of the invention relates to a tool holder and a clamping system of such a tool holder, which permit particularly high concentricity and stable fastening of the clamped-in tool and at the same time are simple to produce.

Accordingly, a tool holder, a clamping system, and a method for production of a tool receptacle for such a tool holder are disclosed herein. Expedient modifications and advantageous embodiments of the invention are also disclosed.

The receptacle in the tool holder according to the invention has two clamping sections spaced from each other, between which the at least one blocking element is arranged. The tool can be tightened particularly firmly relative to being introduced in the receptacle via the two spaced clamping sections of the receptacle in the form of a force-fit, and clamping of the tool especially can also occur on the free end of the tool shank so that the concentricity and fastening of the tool are improved. According to the invention, the receptacle can also be divided into more than two clamping sections that hold the tool, but it is essential that the blocking element be arranged between two clamping sections of the receptacle. It is essential according to the invention that the blocking elements be designed to secure the tool shank against undesired movement, especially axial micromovements and radial movements, the tool shank being clamped by the clamping sections.

The at least one blocking element in an advantageous embodiment can be arranged on a support surface that is offset radially outward relative to the receptacle. This guarantees that the tool being clamped is frictionally clamped merely via the spaced clamping sections of the receptacle so that a disadvantageous effect of this frictional clamping by the support surface can be prevented. In addition, the support surface having the blocking elements can also be manufactured with particular simplicity.

The support surface with particular advantage can be formed in a peripheral annular groove. The receptacle for clamping of the tool is divided by the annular groove into an outer clamping section and an inner clamping section. The outer clamping section is arranged close to one open end of the receptacle, whereas the inner clamping section is arranged away from the open end of the receptacle. The annular groove is then dimensioned such that the at least one blocking element is formed completely within it, i.e., does not protrude in the clamping section.

Moreover, in an advantageous embodiment, an additional annular groove can be arranged between the blocking element and the two clamping sections of the receptacle. In order to permit simple manufacture, these additional peripheral annular grooves can be offset radially outward relative to the peripheral annular groove of the support surface. These additional annular grooves are therefore designed as an undercut and additionally facilitate manufacture of the receptacle.

A particularly preferred embodiment having a support surface that is offset radially outward relative to the receptacle also has a further advantage relative to the prior art. If a tool is clamped torque-free by means of friction, this generally occurs by narrowing the receptacle opening for the tool. If such a receptacle opening has a blocking element, this is forced against or into the tool during the clamping process, just like the surface enclosing the blocking element. In the prior art, damage to the tool shank or receptacle opening can occur because of this repeated pressure against the blocking element and the surrounding surface. For example, the blocking grooves on the tool can be deformed such that the tool can tilt during increasing use. The blocking elements can also be deformed against the blocking groove or on the shank of harder tools, which also can lead to tilting. There is also the hazard that sensitive locations on chucks, especially the membrane of a hydraulic expansion chuck, will be harmed and the chuck irreparably damaged on this account. This naturally also applies in the opposite case, when the tool has a blocking element and a blocking groove is located in the tool receptacle.

Reducing the size of the blocking elements is generally not possible, because this would hamper precise insertion of the tool and might weaken the holding force.

A particularly preferred embodiment of the invention solves this problem, in which a blocking element is positioned not within the clamping surfaces, but between two clamping sections spaced from each other that are separated by a radially outward offset support surface, which again has a blocking element. Neither the blocking element nor the support surface enclosing the blocking element in the radial direction is forced into or against the blocking groove or tool shank. The surface enclosing the blocking element in the radial direction exerts no force on the tool shank.

The tool holder, in an advantageous embodiment, consists of a main body having a deformable receptacle for clamping of a tool and at least one blocking element that is designed to engage in a corresponding counter-element on the tool to prevent axial migration of the tool from the tool holder and is arranged on the receptacle, the receptacle having two clamping sections spaced from each other, between which the at least one blocking element is arranged, the at least one blocking element being arranged on a support surface that is offset radially outward relevant to the receptacle and in which the support surface also has no contact with the tool shank in the clamped state.

A damping effect that reduces the vibration tendency of the rotating tool can also be produced by the support surface offset radially outward relative to the receptacle.

In a particularly advantageous embodiment, the at least one blocking element is designed on the receptacle as an inward-protruding protrusion to engage in a corresponding recess on the shank of a tool being clamped, this protrusion being expediently designed in one piece with the receptacle and being produced from a solid block by means of a material-ablating spark erosion method and/or by means of an electrochemical ablation method in a recess. However, the blocking element provided on the receptacle could also be correspondingly designed as a recess and the related main body designed on the tool as a protrusion. The blocking element can have a semicircular or partially circular cross-section for simplified engagement in the corresponding counter-element.

Preferably, over the entire height of the blocking element no abutment is produced in the radial direction between the tool and tool holder, except for engagement between the blocking element and blocking groove.

The at least one blocking element can advantageously extend in the fashion of a thread at least over a partial periphery of the receptacle on its inside. More uniform holding over the periphery can be achieved in that several blocking elements, for example, two, three or four, running at least over a partial periphery of the receptacle are arranged as a thread on the inside of the receptacle. When there are several blocking elements, they are expediently arranged on the receptacle spaced at the same angle in the peripheral direction.

In a particularly expedient embodiment, the receptacle is an expansion bushing arranged in a receptacle opening of the main body and that can be acted upon from the outside using hydraulic fluid, on whose inside the at least one blocking element is arranged.

However, the receptacle can also be a shrink-fit chuck designed in one piece with the main body, a rolling force chuck, a reducing sleeve arranged within a chuck or a collet chuck arranged within a receptacle opening of the main body and deformable by means of a clamping element, on whose inside the at least one blocking element is arranged, or another frictionally clamping system.

In an embodiment that is expedient for manufacture and suitable for assembly, the at least one blocking element can be directly molded on the receptacle. The blocking element, however, can also be a separate component, designed, for example, as a ball, blocking pin or the like, that is fastened to the receptacle and extends in the receptacle area.

The receptacle can be made from ceramic, metal or a mixture of both.

The clamping system according to the invention includes a tool holder and tool, in which the tool holder contains a main body, a deformable receptacle for clamping of the tool and at least one blocking element designed in one piece with the receptacle or mounted as a separate component, which engages in a corresponding counter-element on the tool to prevent axial migration of the tool from the tool holder, the receptacle having two clamping sections spaced from each other, between which the at least one blocking element is arranged.

For direct molding of the blocking element on the receptacle, the receptacle according to the invention is preferably produced by means of a material-ablating process from a solid metallic material by generation of a recess, in which case, during generation of the recess, for formation of the blocking element formed in one piece with the receptacle, at least one protrusion protruding in the recess is made such that the receptacle is divided into two clamping sections, between which the at least one blocking element is arranged. The blocking element is formed in one piece on the receptacle between the two clamping sections of the receptacle. To produce the receptacle from a metallic solid material, material-ablating spark erosion methods, like EDM (electrical discharge machining), and/or electrochemical ablation methods, like ECM (electrochemical machining), or a combination thereof, like ECDM (electrochemical discharge machining), have proven particularly expedient. With such material-ablating methods the complex structures for formation of protrusions extending inward in the receptacle can be produced and that form the blocking elements according to the invention. To produce the recess in a solid material block, machining methods initially in a first processing step and material-ablating spark erosion methods, like EDM (electrical discharge machining), and/or electrochemical ablation methods in a concluding processing step can be used, in which the fine structures that form the blocking elements can then be made to form protrusions in the recess. It is understood that the recess can also be produced completely using machining methods.

In an alternative production method, the receptacle can also be produced from ceramic and/or metal powder by pressure or laser sintering or using other additive methods.

Preferably, the blocking groove is also formed thread-like on the tool, i.e., the blocking groove runs at least partially in a spiral form around the shank of the tool. It should then be emphasized that both the at least one blocking element and the blocking groove are formed in the fashion of a nut or bolt thread but have no actual thread. The pitch of the blocking groove is thus ideally greater than the groove width, and several blocking elements having the same shape can also be formed at the same axial height. This is made possible in that a blocking element has only a comparatively short extent when viewed both in the axial and radial direction so that a complete thread is not formed in the radial direction. The at least one blocking element is preferably aligned at an angle between 50° and 70°, preferably 60°, relative to a plane across the axis of rotation. In practice, this means that the tool can be changed with significantly greater speed, this being a significant advantage, especially in shrink-fit chucks. The tool then preferably requires less than a full 360° rotation for insertion.

By forming the blocking groove as a thread opposite the direction of rotation of the tool on the tool shank, the blocking groove exerts its blocking effect over its entire axial extent. The tool can therefore be kept torque-free and secured against pullout everywhere the blocking element and blocking groove engage. In practice, this entails a convenient possibility of length adjustment of the tool for the user. Ideally, the blocking groove then has a constant depth.

In order to be able to reliably and quickly insert the tool, it is advantageous if the blocking groove on the tool begins on the side that faces away from cutting. In special embodiments it can be prescribed that the beginning of the blocking groove deviates from the remaining trend, in which this is formed not in a spiral, for example, but is straight or has an increased groove width. Insertion of the tool can be simplified on this account. The blocking groove in this section is only conditionally capable of keeping the tool torque-free and secure from pullout at the same time.

BRIEF DESCRIPTION OF THE DRAWINGS

Additional details and advantages of the invention are apparent from the following description of a preferred practical example with reference to the drawing. In the drawing.

DETAILED DESCRIPTION OF THE INVENTION

Figure 1:
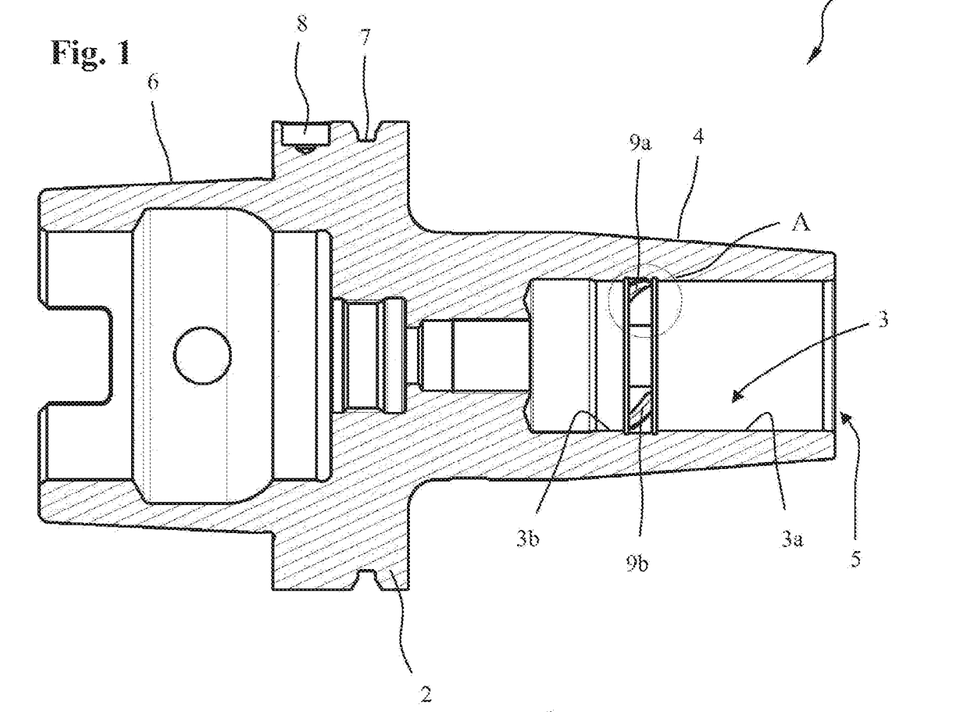
FIG. 1 shows a tool holder in the form of a shrink-fit chuck for thermal clamping of a tool in a longitudinal section.

FIG. 1 shows in longitudinal section a rotating tool holder 1 depicted here as an HSK shrink-fit chuck having a rotationally symmetric main body 2 and a receptacle 3 arranged in the main body 2 for clamping the shank of a rotating tool (not shown here). The main body 2 has a slightly tapering front part 4 having a receptacle opening 5 and a conical rear part 6 to accommodate a machine tool in an operating spindle. A gripper groove 7 and a mount 8 for a means of identification (not shown) for distinct electromagnetic or optical identification of the tool holder 1 is provided between the front part 4 and the conical rear part 6 on the outside of the main body 2.

The receptacle 3 for clamping of a tool is designed as a cylindrical hole and has an outer clamping section 3*a* and an inner clamping section 3*b*, each of which act as a force-fit area for a tool shank of a tool. Several blocking elements 9*a*, 9*b* are arranged between the clamping sections 3*a*, 3*b* that are designed to prevent axial migration of the tool from the tool holder for engagement with corresponding counter-elements on the tool. The length of the inner clamping section 3*b* is at least ⅟20, preferably more than ⅟10 and especially more than ⅕, the length of the outer clamping section 3*a*.

Figure 2:
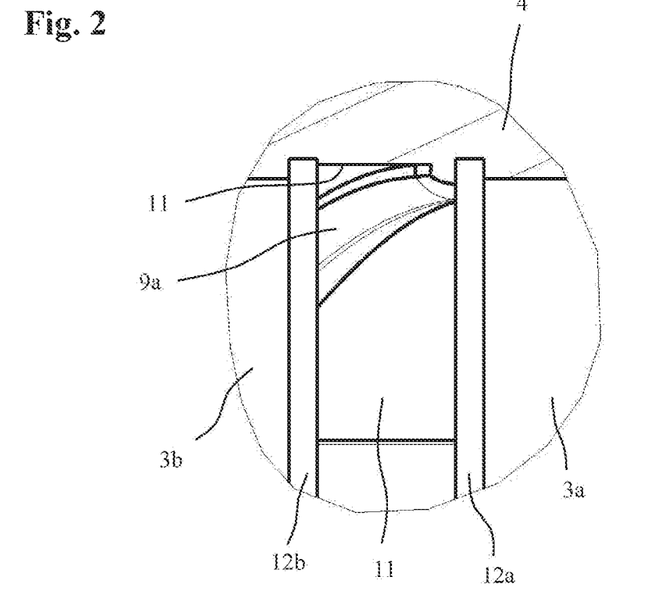
FIG. 2 shows a detail view of area A of FIG. 1.

A detail view of area A of FIG. 1 is shown in FIG. 2. As can be deduced from FIG. 2, the blocking element 9*a*, like the blocking element 9*b* (not shown), is arranged on the support surface 10 that is radially offset outward relative to the receptacle 3. The support surface 10 is formed by the bottom of the annular groove 11. An additional peripheral annular groove 12*a* or 12*b* is arranged in the axial direction of the receptacle 3 between the annular groove 11 of the support surface 10 and the outer clamping section 3*a* and inner clamping section 3*b* of the receptacle 3. The additional annular grooves 12*a*, 12*b* are offset radially outward relative to the peripheral annular groove 11 of the support surface 10 such that an undercut is formed on both sides of the annular groove 11.

The receptacle 3, in an embodiment not shown, can also be designed as a conical hole for clamping of a conical shank of a rotating tool. This means that, in contrast to the depicted embodiment, the diameter of the clamping sections 3*a*, 3*b* of the receptacle 3 is not constant, but continuously diminishes from the outer clamping section 3*a* to the inner clamping section 3*b*. In this case the additional peripheral annular grooves 12*a*, 12*b* and also the annular groove 11 are offset radially outward relative to the adjacent areas of the outer clamping section 3*a* and the inner clamping section 3*b* so that an undercut is also achieved.

Figure 3:
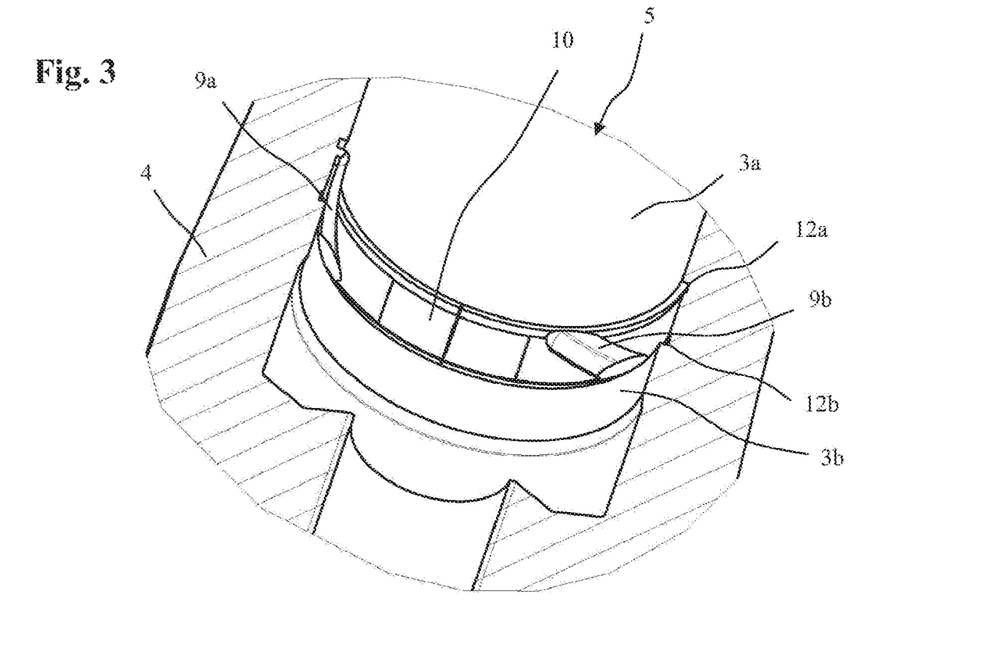
FIG. 3 shows a perspective sectional view of area A of FIG. 1.

As is especially apparent from the perspective view of the sectional view of FIG. 2 as shown in FIG. 3, the blocking elements 9*a*, 9*b* are formed as protrusions protruding inward in the receptacle opening 5, which run over a partial periphery of the receptacle in the fashion of a thread and are formed to engage in corresponding counter-elements on a cylindrical shank (not shown here) of the tool.

The blocking elements 9*a*, 9*b* have a semicircular cross-section and are arranged having additional blocking elements not shown in the sectional view at a spacing from each other at equal angles in the peripheral direction. In the practical example a total of three protrusions spaced at equal angles from one another in the peripheral direction are provided in the form of threads as blocking elements 9*a*, 9*b* and that run in the fashion of a triple-start thread each having the same pitch angle on the receptacle 3 between the outer clamping section 3*a* and the inner clamping section 3*b*. The counter-elements matching the blocking elements 9*a*, 9*b* on the tool are designed accordingly as blocking grooves, which run coil-like in the fashion of a triple-start thread on the outside of the cylindrical shank of the tool, beginning on the rear face along the peripheral surface. A pull-out safety device is created by the blocking elements 9*a*, 9*b* engaging in the corresponding counter-elements on the tool, which prevents axial migration of the tool caused, for example, by vibrations during machining.

The receptacle 3 is expediently produced according to the method of the invention from a metallic solid material block (for example, a solid cylinder) by generation of a recess by means of a material-ablating spark erosion method (for example, EDM or ECDM), in which the blocking elements 9*a*, 9*b* are removed as inward-protruding protrusions in the cylindrical hole during generation of the recess.

Figure 4:
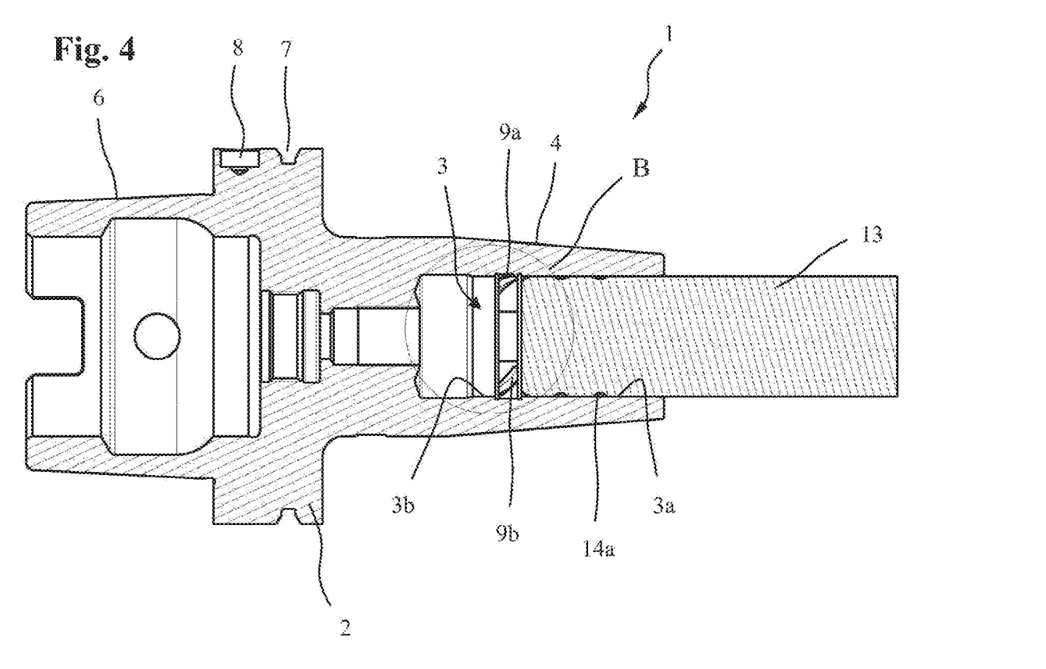
FIG. 4 shows the tool holder of FIG. 1 in a first installation stage with a partially inserted tool.

FIG. 4 shows the tool holder 1 of FIG. 1 in a first installation stage with a partially inserted tool 13. Tool 13 is preferably a rotating tool for machining, for example, a cylindrical end mill. For clamping of the tool 13 in the tool holder 1, the tool 13 after insertion in the tool holder 1 must initially be rotated so that the blocking element 9*a* on the receptacle 3 engages with the corresponding counter-element 14*a* on the tool 13. As already described, the counter-element 14*a* on the tool 13 (corresponding to the blocking element 9*a*) is designed coil-like together with additional counter-elements as a blocking groove in the fashion of a triple-start thread on the outside of the cylindrical shank of the tool 13, beginning on the rear face along the peripheral surface.

Figure 5:
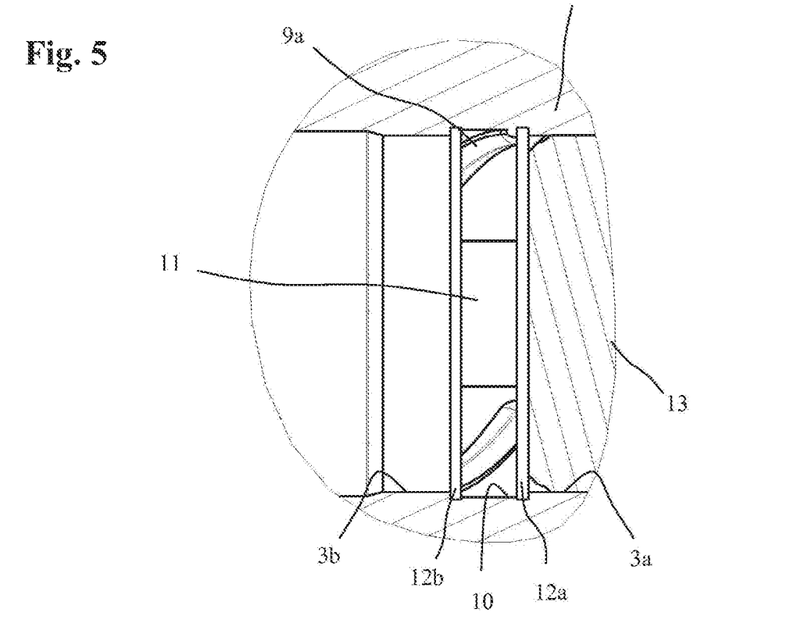
FIG. 5 shows a detail view of area B of FIG. 4.

A detail view of area B of FIG. 4 is shown in FIG. 5. As can be seen there, in this first installation stage the tool 13 is inserted straight up to the additional annular groove 12*a* between the annular groove 11 having the support surface 10 and the outer clamping section 3*a* of the receptacle 3. This installation step can occur particularly quickly, because the tool 13 can be inserted axially in the receptacle opening 5 in a straight line without a special angle position relative to the tool holder 1. On further insertion of the tool 13 in the receptacle opening 5, the rear face of the cylindrical shank of the tool 13 comes in contact with the blocking elements 9*a*, 9*b* protruding inward in the receptacle opening 5. In this position the tool 13 must be altered in its angular position relative to the tool holder 1 by rotation along its longitudinal axis until the counter-element 14*a* formed as a blocking groove on the tool 13 together with the additional counter-elements engage with the blocking elements 9*a*, 9*b* and further screw-like insertion of the tool 13 is made possible.

Figure 6:
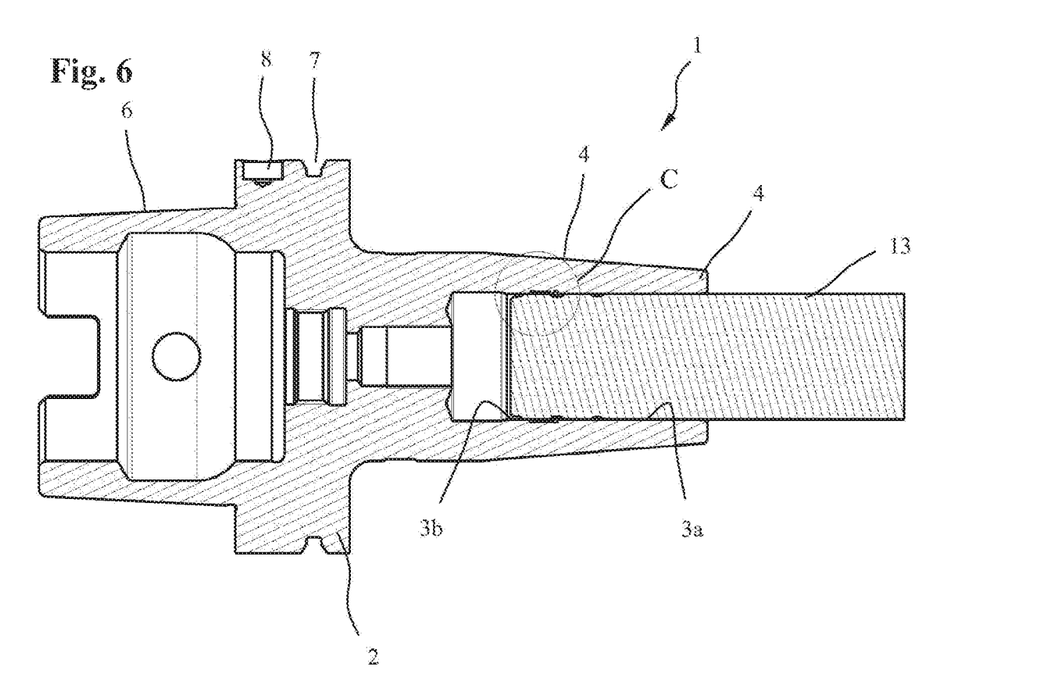
FIG. 6 shows a tool holder of FIG. 4 in a second installation stage with a further inserted tool.
Figure 7:
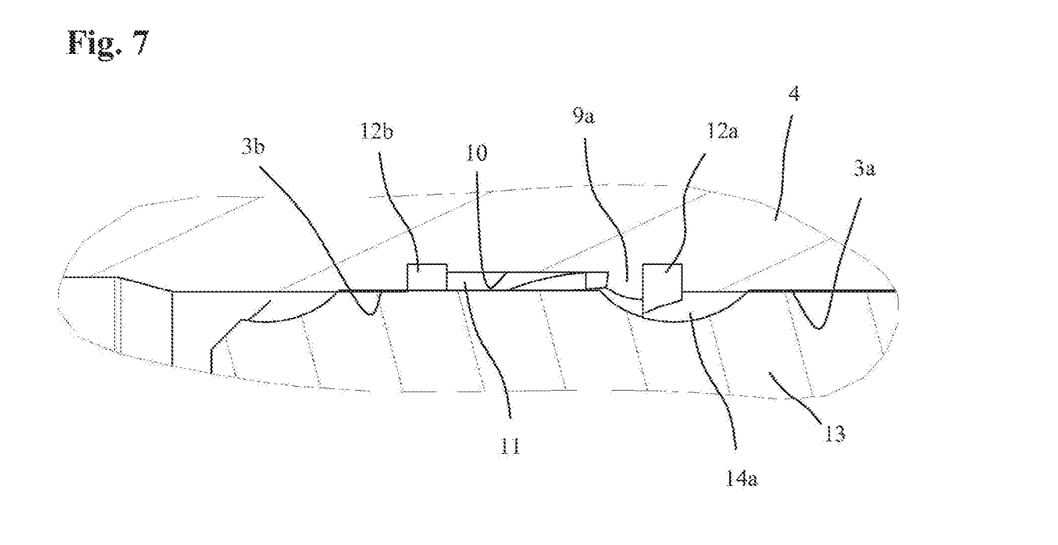
FIG. 7 shows a detail view of area C of FIG. 6.

The tool holder 1 of FIG. 4 is shown in FIG. 6 in a subsequent second installation stage having a further inserted tool 13, in which the tool 13 lies against both the outer clamping section 3*a* and the inner clamping section 3*b* of the receptacle 3. As can be seen in particular from the detail view of area C of FIG. 6 in FIG. 7, the depicted blocking element 9*a* then engages in shape-mated fashion in the counter-element 14*a* designed as a blocking groove. The additional blocking elements (not shown) distributed over the periphery of the receptacle also engage in the corresponding additional blocking grooves so that the tool 13 is guided along the receptacle 3 helically distributed around the periphery. Further installation of the tool 13 finally occurs by means of a combined rotating/pushing movement in the form of screw movement.

Figure 8:
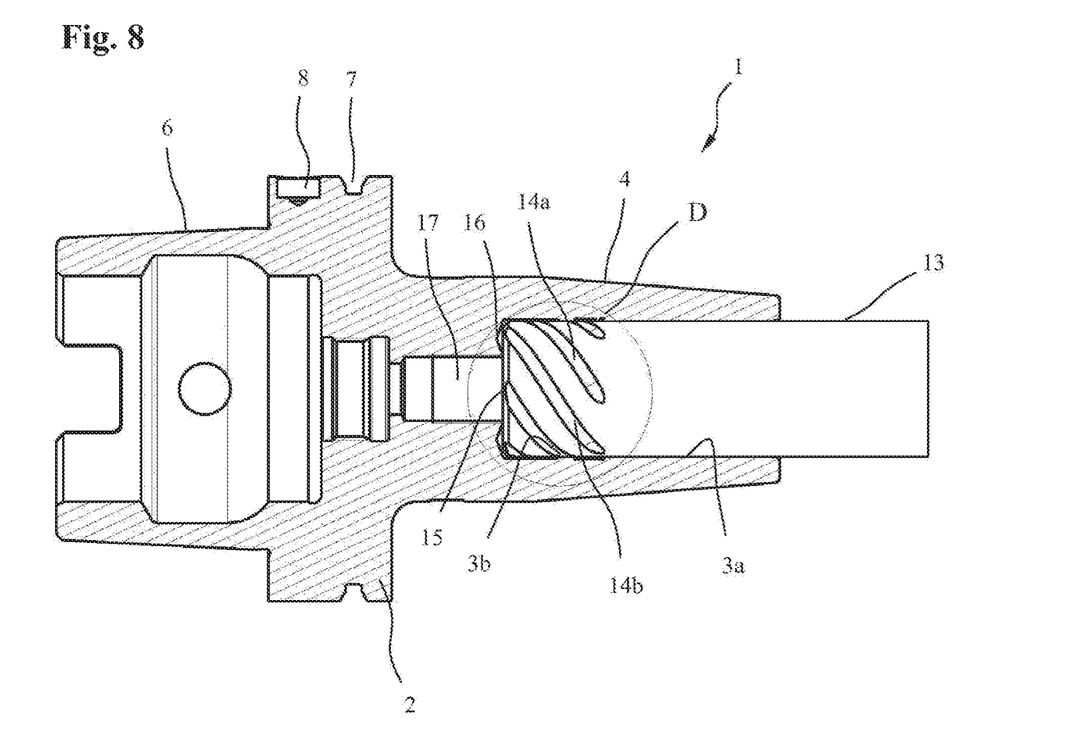
FIG. 8 shows the tool holder of FIG. 6 in a final installation stage with a fully inserted tool and FIG. 9 shows a detail view of area D of FIG. 8.

The tool holder 1 of FIG. 6 is shown in FIG. 8 in a final installation stage having a fully inserted tool 13 in half-section. As can be seen in the side view of the tool 13 and as already described, the counter-elements 14a, 14b run axially along the peripheral surface in coil-like fashion as blocking grooves in the fashion of a triple-start thread on the outside of the cylindrical shank of the tool 13, beginning on the rear face 15.

In the depicted concluding installation stage, the tool 13 having the face 15 lies against a bottom section 16 of the receptacle opening 5. A central through-hole 17 is provided in the bottom section 16 for passage of coolant and lubricant through the tool holder 1 to the tool 13. The through-hole 17 is designed as a threaded hole into which an axially adjustable stop screw can be inserted (not shown). In this variant the tool 13 having the shank end 15 can be pushed in to a defined stop. It is understood that the stop screw is preferably perforated for passage of coolant/lubricant.

Figure 9:
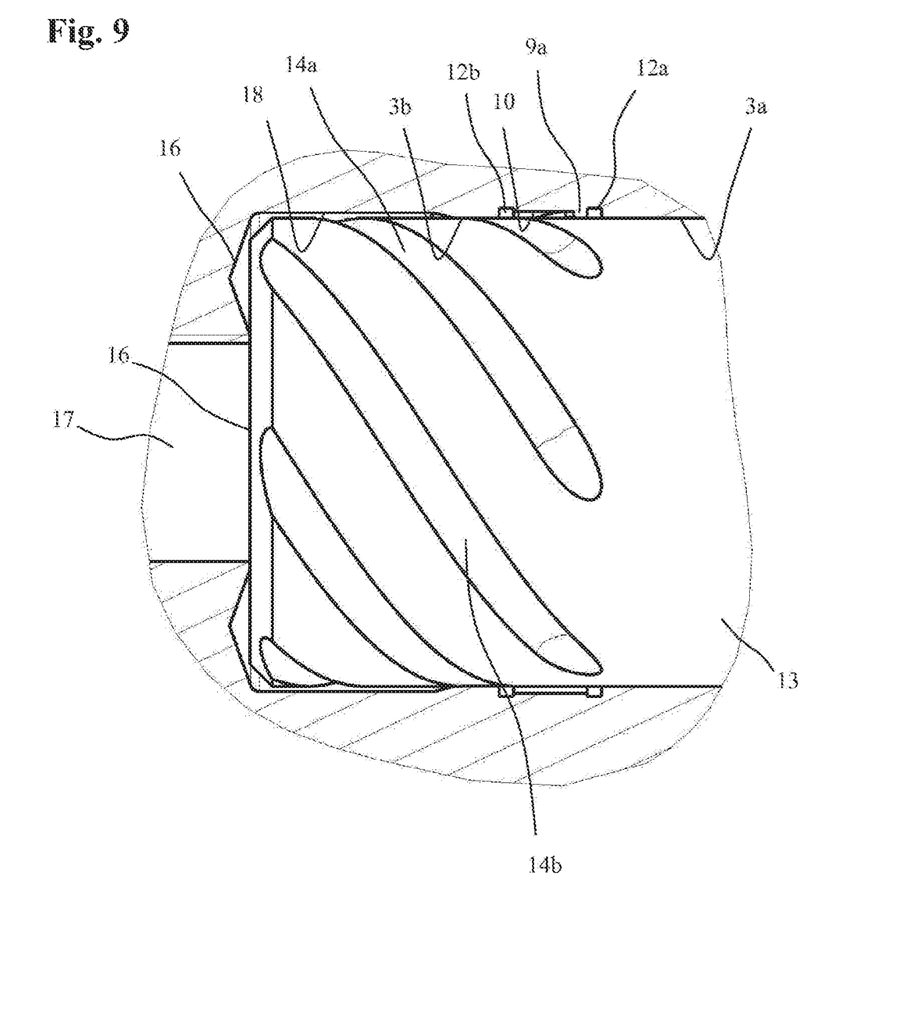

A detail view of area D of FIG. 8 is shown in FIG. 9. Simple manufacture of the inner section 3b of the receptacle 3 is achieved, in that an intermediate area 18 radially offset outward is provided between the bottom section 16 and the inner clamping section 3b of the receptacle 3 relative to the inner clamping section 3b.

As already explained, in the depicted embodiment, the receptacle 3 is designed as a shrink-fit chuck formed in one piece with the main body 2. The shrink-fit chuck in such a tool holder 1 is thermally heated, for example, by inductive heating so that the inside diameter of the shrink-fit chuck is increased. In the heated state, the tool 13 is inserted in the shrink-fit chuck, in which case the ratio of inside diameter of the shrink-fit chuck 13 to outside diameter of the tool shank is laid out so that the tool 13 on subsequent cooling of the shrink-fit chuck is firmly held in the shrink-fit chuck. Shape-mated holding of the tool 13 can be achieved by the blocking elements 9a, 9b protruding inward on the inside of the receptacle 3 of the shrink-fit chuck in the form of coil-like protrusions for engagement in the counter-elements 14a, 14b designed as blocking grooves on the tool shank of the tool 13.

The tool can also be tightened within the shrink-fit chuck via a reducing sleeve. The reducing sleeve is designed in known fashion as a slotted sleeve having several axial slits and an inside diameter adapted to the outside diameter of the tool shank. The reducing sleeve has, on the receptacle on its inside, inward-protruding blocking elements in the form of coil-like protrusions for engagement in counter-elements designed as blocking grooves on the tool shank of the tool between two clamping sections of the receptacle. The reducing sleeve also contains, on its outside, coil-like blocking grooves for engagement with the blocking elements that are formed on the inside of the receptacle of the shrink-fit chuck in the form of inward-protruding protrusions that run in coil-like fashion. Because of this a pull-out safety device to prevent axial migration of the reducing sleeve is also achieved.

Instead of a shrink-fit chuck, the tool holder 1 can also be designed as a hydraulic chuck having an expansion bushing as receptacle. In this case the expansion bushing can be acted upon from the outside using hydraulic fluid so that the expansion bushing is forced inward by the pressure and the tool 13 is clamped with it. In this embodiment, inward-protruding blocking elements are also provided on the receptacle on the inside of the chuck for engagement in counter-elements designed as blocking grooves on the tool shank of the tool between two clamping sections of the receptacle. Axial migration of the tool from the tool holder can also be prevented here via the shape-mated engagement of the blocking elements in the corresponding counter-elements. A hydraulic chuck having a reducing sleeve can also be used similarly to the shrink-fit chuck.

The tool holder 1 can also be designed as a collet chuck, in which the receptacle is formed as a collet arranged within a receptacle opening of the main body and deformable by means of a clamping element. The collet has an outer cone surface for contact against an inner cone surface of the receptacle opening. The cone surfaces are then adjusted to each other so that the collet can be compressed inward by means of axial displacement and in so doing clamps the tool shank of the tool. The collet also has inward-protruding blocking elements on its inside on the receptacle in the form of coil-like protrusions for engagement in the counter-elements designed as blocking grooves on the tool shank of the tool between two clamping sections of the receptacle. The axial displacement of the collet occurs through the clamping element, which is designed here as a threaded ring screwed onto an outside thread on the front end of the main body. Axial displacement of the collet can also occur by means of an axial force applied from the outside, for example, using a hydraulic compression device.

In another embodiment, the tool holder can also be designed as a so-called roller force chuck. The main body has a clamping area provided with longitudinal grooves on a front part as a receptacle for the tool shank of the tool. A chuck mounted to rotate by means of a needle bearing or other roller bearing is ordinarily arranged on the deformable clamping area, through whose rotation a clamping force can be exerted on the deformable clamping area. The needle rollers mounted within a bearing cage roll during rotation of the chuck on the tapering inside surface of the chuck and the tapering outer surface of the deformable clamping area so that, during tightening of the chuck, the chuck presses against the deformable clamping area via the needle rollers in order to force the deformable clamping area against the shank of the tool. The inward-protruding blocking elements are also designed here as coil-like protrusions for engagement in the counter-elements designed as blocking grooves on the tool shank of the tool between two clamping sections of the receptacle.

The blocking elements are then arranged on the inside of the deformable clamping area. However, it is also possible to arrange the blocking elements further within the main body. In addition, a reducing sleeve could also be arranged between the deformable clamping area and the tool shank.

WO 2013/098192 A1 is referred to fully for the different embodiments and their features, the contents of which are included here.

The invention is naturally not restricted to HSK tool holders. SK, JIS, BT, ABS or Capto interfaces and the like can also be accordingly provided on the main body.

The blocking elements need not necessarily be arranged in the deformable area of the receptacle. They can also lie in the non-deformable area or in the area of the main body.

LIST OF REFERENCE NUMBERS

1 Tool holder
2 Main body
3 Receptacle
3a Outer clamping section of the receptacle 3b Inner clamping section of the receptacle
4 Front part
5 Receptacle opening
6 Rear part
7 Gripper groove
8 Mount
9a, 9b Blocking elements
10 Support surface
11 Annular groove
12a, 12b Additional annular groove
13 Tool
14a, 14b Counter-element
15 Face of the tool
16 Bottom section
17 Through-hole
18 Intermediate area

The invention claimed is:

1. A tool holder for a tool having a counter element, the holder comprising:
a main body;
a deformable receptacle for clamping of a tool, the receptacle including two spaced apart deformable clamping sections; and
at least one blocking element
(a) sized and dimensioned to engage the counter-element on the tool to thereby prevent axial migration of the tool from the tool holder,
(b) arranged within the receptacle,
(c) arranged between the two clamping sections and not within either of the two clamping sections of the receptacle, and
(d) each arranged on a support surface formed in a peripheral annular groove that extends radially outward relative to the clamping sections of the receptacle.

2. The tool holder according to claim 1, wherein an additional peripheral annular groove is arranged between the blocking element and each of the two clamping sections of the receptacle.

3. The tool holder according to claim 2, wherein the at least one blocking element is arranged on a support surface that is offset radially outward relative to the receptacle, wherein the support surface is formed in a peripheral annular groove, and wherein the additional peripheral annular grooves are offset radially outward relative to the peripheral annual groove having the support surface.

4. The tool holder according to claim 1, wherein the receptacle has the form of a cylindrical hole.

5. The tool holder according to claim 1, wherein the at least one blocking element has the form of an inward-protruding protrusion.

6. The tool holder according to claim 1, wherein the at least one blocking element has a semicircular or partially circular cross-section.

7. The tool holder according to claim 1, wherein the at least one blocking element extends in the fashion of a thread at least partially over the extent of the receptacle on an inside of the receptacle.

8. The tool holder according to claim 1, wherein the at least one blocking element comprises several blocking elements arranged on the receptacle spaced at equal angles in the peripheral direction.

9. The tool holder according to claim 1, wherein the receptacle is an expansion bushing arranged in a receptacle opening of the main body and that can be acted upon from the outside using hydraulic fluid, on whose inside the at least one blocking element is arranged.

10. The tool holder according to claim 1, wherein the receptacle is designed as a shrink-fit chuck made in one piece with the main body, on whose inside the at least one blocking element is arranged.

11. The tool holder according to claim 1, wherein the receptacle is designed as a reducing sleeve arranged inside a shrink-fit chuck, on whose inside the at least one blocking element is arranged.

12. The tool holder according to claim 1, wherein the receptacle is designed as a collet chuck arranged within a receptacle opening of the main body and deformable by a clamping element, on whose inside the at least one blocking element is arranged.

13. The tool holder according to claim 1, wherein the receptacle is designed as a clamping area arranged on a front part of the main body, which is deformable by a chuck mounted to rotate on the main body by a roller bearing.

14. The tool holder according to claim 1, wherein the receptacle includes ceramic, metal or a mixture of both.

15. The tool holder according to claim 1, wherein the two spaced apart clamping sections include an inner clamping section adjacent a bottom end of the receptacle and an outer clamping section adjacent an open end of the receptacle, the support surface and the at least one blocking element positioned between the inner and outer clamping sections.

16. The tool holder according to claim 15, wherein a length of the inner clamping section is at least 1/20 the length of the outer clamping section.

17. A clamping system comprising the tool holder according to claim 1 and a tool.

18. The tool holder of claim 1, wherein the deformable clamping sections are of a type selected from a roller bearing, shrink fit engaged by heating then cooling, hydraulic with expansion bushing, reducing sleeve, collet chuck, frictional.

19. The tool holder of claim 1, wherein the support surface has no contact with the tool shank when a tool shank is clamped within the tool holder.

20. A tool holder for a tool having a counter element, the holder comprising:
a main body;
a deformable receptacle for clamping of a tool, the receptacle including two spaced apart force fit clamping sections; and
at least one blocking element
(a) sized and dimensioned to engage the counter-element on the tool to thereby prevent axial migration of the tool from the tool holder,
(b) arranged within the receptacle,
(c) arranged between the two clamping sections and not within either of the two clamping sections of the receptacle, and
(d) each arranged on a support surface formed in a peripheral annular groove that extends radially outward relative to the clamping sections of the receptacle.

* * * * *